United States Patent [19]

Gray et al.

[11] 4,247,228

[45] Jan. 27, 1981

[54] DUMP TRUCK OR TRAILER WITH PNEUMATIC CONVEYOR

[75] Inventors: Morton E. Gray; Carl E. Green, both of Fort Worth, Tex.

[73] Assignee: Morton E. Gray, Fort Worth, Tex.

[21] Appl. No.: 26,070

[22] Filed: Apr. 2, 1979

[51] Int. Cl.³ ............................ B60P 1/04; B60P 1/60; B65G 53/40
[52] U.S. Cl. ...................................... 406/39; 406/109
[58] Field of Search .................................. 406/38–44, 406/109

[56] References Cited

U.S. PATENT DOCUMENTS

| 2,865,521 | 12/1958 | Fisher et al. | 406/109 |
| 3,099,497 | 7/1963 | Albert | 406/39 |
| 3,372,958 | 3/1968 | Black | 406/109 X |
| 4,016,994 | 4/1977 | Wurster | 406/39 |

Primary Examiner—James L. Rowland
Attorney, Agent, or Firm—James E. Bradley

[57] ABSTRACT

A dump truck or trailer for hauling and dumping dry bulk solids conventionally by gravity and also having the capability of conveying the solids upward to a storage facility. The unit includes a container mounted to a frame on wheels. A hydraulic ram tilts the container for dumping through a rear outlet. A pneumatic conveyor is carried by the frame with an intake at the rear of the container. A gate allows the solids to be dumped conventionally by gravity, or to be blown to a storage facility by the pneumatic conveyor.

6 Claims, 4 Drawing Figures

DUMP TRUCK OR TRAILER WITH PNEUMATIC CONVEYOR

BACKGROUND OF THE INVENTION

1. Field of the Invention

This invention relates in general to containers for hauling bulk products and in particular to a dump truck or trailer with the capability of dumping conventionally by gravity or conveying upward to a storage facility.

2. Description of the Prior Art

In oil and gas well hydraulic fracturing treatments, a liquid under very high pressure is pumped into the well in order to cause the formation to fracture. While the fractures remain open due to the high pressure being exerted, granules of sand or other small hard particles are mixed with the liquid being pumped. Granules enter the fractures, propping them open when the pressure is relieved. To inject the sand, a large mixing machine is used to mix the sand with water and chemicals. Due to the high flow rate, the sand must be dumped in a high rate. Conventional trailers or trucks having tilting beds dump directly into the hopper of the mixer in order to achieve this high flow rate.

Various sizes or grades of fine sand are used in the fracturing process. Typically, the sand is purchased at a remote area, then shipped to a terminal by rail. At the rail terminal, the sand is conveyed to a pneumatic or pressure tank truck, which then hauls the sand to a field office of the service company that handles fracturing treatments. Air pressure is applied to the tank to blow the sand to a silo or storage facility at the field office.

When a well is to be treated, the sand may be handled in one or two ways. For large jobs, a temporary storage facility or silo may be set up at the well site. Sand from the field office silo or the rail terminal is hauled by a pressure tank truck to the well site. Air pressure is used to blow the sand from the pressure tank into the temporary silo. During the fracturing process, sand from the temporary silo is conveyed to a dump truck, which in turn moves over and dumps directly into the mixer. Known conveyors of reasonable size do not have sufficient capacity to handle the high flow rate required for dumping sand in the mixer. Consequently, the pressure tank truck is not able to discharge directly into the mixer hopper.

In smaller jobs, a well site silo may not be used. Dumps trucks may haul the sand directly from the field office to the site. Both methods have disadvantages. In the first case, two types of units are required at the well site, a pressure tank truck and a dump truck. In the latter case, only a dump truck is needed at the well site, but a pressure tank truck is still required to haul the sand from the rail terminal to the field office in most cases. Also, in both cases, if only a part of the load of sand in the dump truck is needed, often the rest must be discarded by dumping on the ground. There is no provision for conveying the sand from the dump truck to a pressure tank truck or to a silo.

A truck or trailer that has the capacity to dump by gravity out the rear into a hopper as well as the capacity to convey up to a storage facility would in many cases eliminate the need for a pressure tank unit. Also wastage of sand left over in the dump truck could be avoided if the dump truck had the capability of conveying the sand to a storage facility. If would be particularly desirable to accomplish the conveying without the need for making the dump truck into a pressure tank. Pressure tanks must be essentially air tight and capable of withstanding up to 25 pounds per square inch pressure, although operable usually at 12 pounds per square per inch pressure. This requires heavy construction and makes the unit more expensive.

U.S. Pat. No. 3,099,497, Albert, discloses a pneumatic conveyor and tank that is mounted on wheels and tilts to facilitate conveying. It, however, requires a pressure tank. Also it is not possible to dump by gravity into a hopper with the device disclosed in this patent.

SUMMARY OF THE INVENTION

It is accordingly a general object of this invention to provide an improved dump truck or trailer with capabilities of dumping dry bulk solids by gravity through a rear chute, and also of conveying the solids upward to a storage facility.

It is a further object of this invention to provide a dump truck or trailer unit with a non-pressure tank and with the capabilities of dumping dry bulk solids by gravity out the rear into a hopper and also conveying the solids upward to a storage facility.

In accordance with these objects, a dump vehicle is provided of a type having a container mounted on a frame. A hoist is mounted between a container and frame for tilting the front end of the container up to discharge by gravity through a rear door. A pneumatic conveyor is mounted to the frame with an inlet at the rear of the container. The conveyor is of a type that is capable of picking up the solids as they flow downward under gravity and blowing them to a storage facility. A gate allows the container to discharge by gravity into a hopper, or selectively to convey the solids to a storage facility by the pneumatic conveyor.

DESCRIPTION OF THE PREFERRED EMBODIMENT

Figure 1:
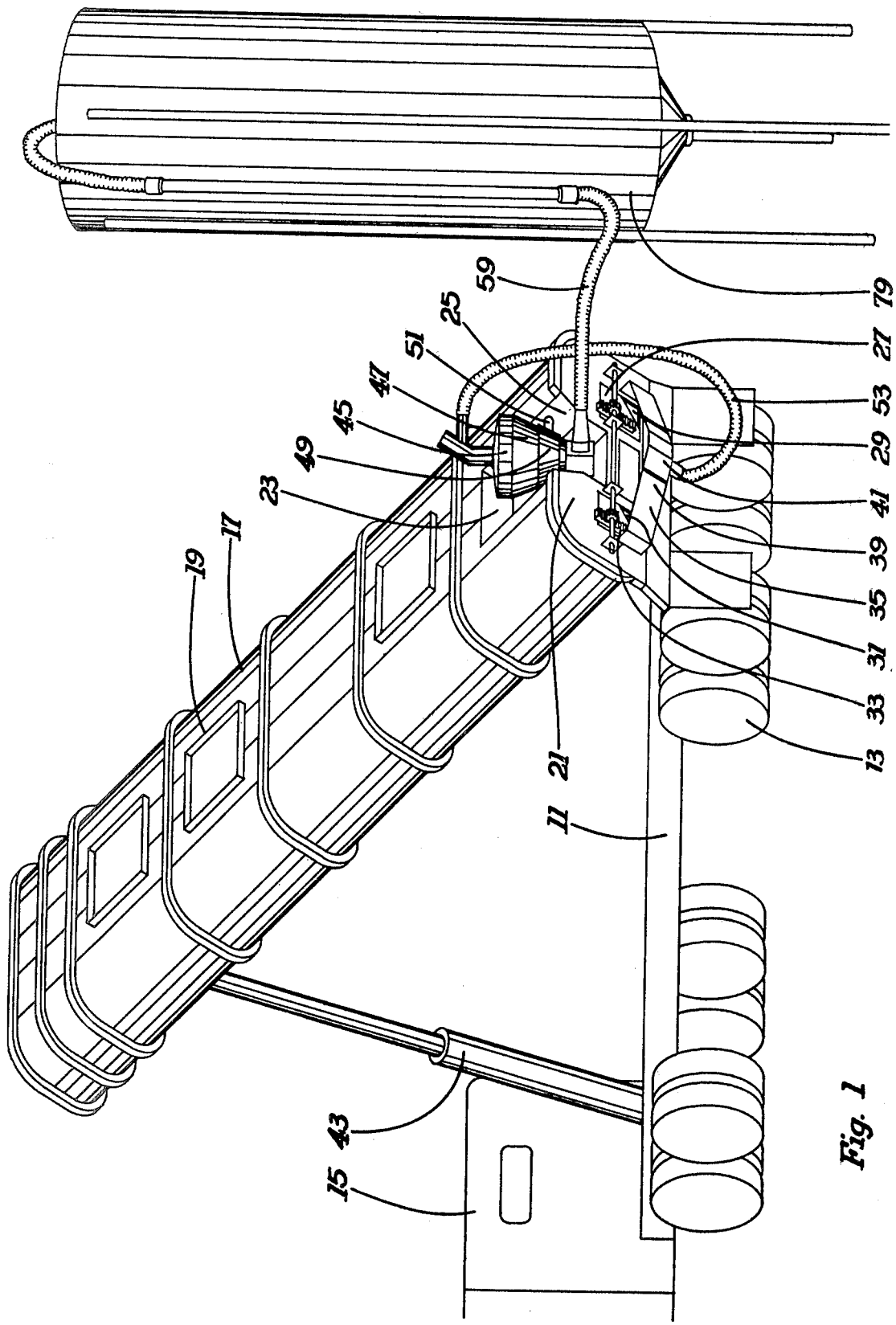
FIG. 1 is an isometric view of a dump truck constructed in accordance with the teachings of this invention, shown conveying the load to a silo.

Referring to FIG. 1, a dump truck is shown in tilted position. The dump truck includes a frame 11 mounted on tandem wheels 13 for highway travel. Frame 11 is moved by prime mover means, whch may be a truck cab 15 integrally connected with frame 11. The prime mover means may also be a separate tractor, with the frame 11 being a trailer connected to the tractor by a fifth wheel connection (not shown).

A bed or container 17 is pivotally mounted to frame 11 by a hinged connection at the rear. Container 17 preferably has a closed top to prevent sand from blowing during highway travel. The container has three separate internal compartments, each with a hatch 19 or inlet at the top for loading. Two upright walls 21 spaced apart but in a common plane define the rear end of the container 17. A cavity is constructed at the rear of container 17. The cavity has a forward wall 23 and two side walls 25 that separate the cavity from the interior of container 17. The space between the two rear walls 21 forms the rear opening to the cavity.

The container has only two outlets and these are located at the bottom of the rear walls 21. A sliding gate 27 is located over each outlet 29. The lower edge 31 of each gate 27 is preferably inclined with respect to the direction of travel of the gate. A rack and pinion gear 33 operates with a crank (not shown) to mechanically raise and lower gates 27.

Although container 17 has a closed top, it is not a pressure tank. The hatches 19 are not airtight, nor can the walls of the container hold substantial pressure. Substantial damage would probably occur if air were pumped in at sufficiently large quantities to raise the pressure beyond a few pounds. No hoppers are located at the bottom for blowing sand out of the tank as is normal with conventional pressure tanks.

Figure 2:
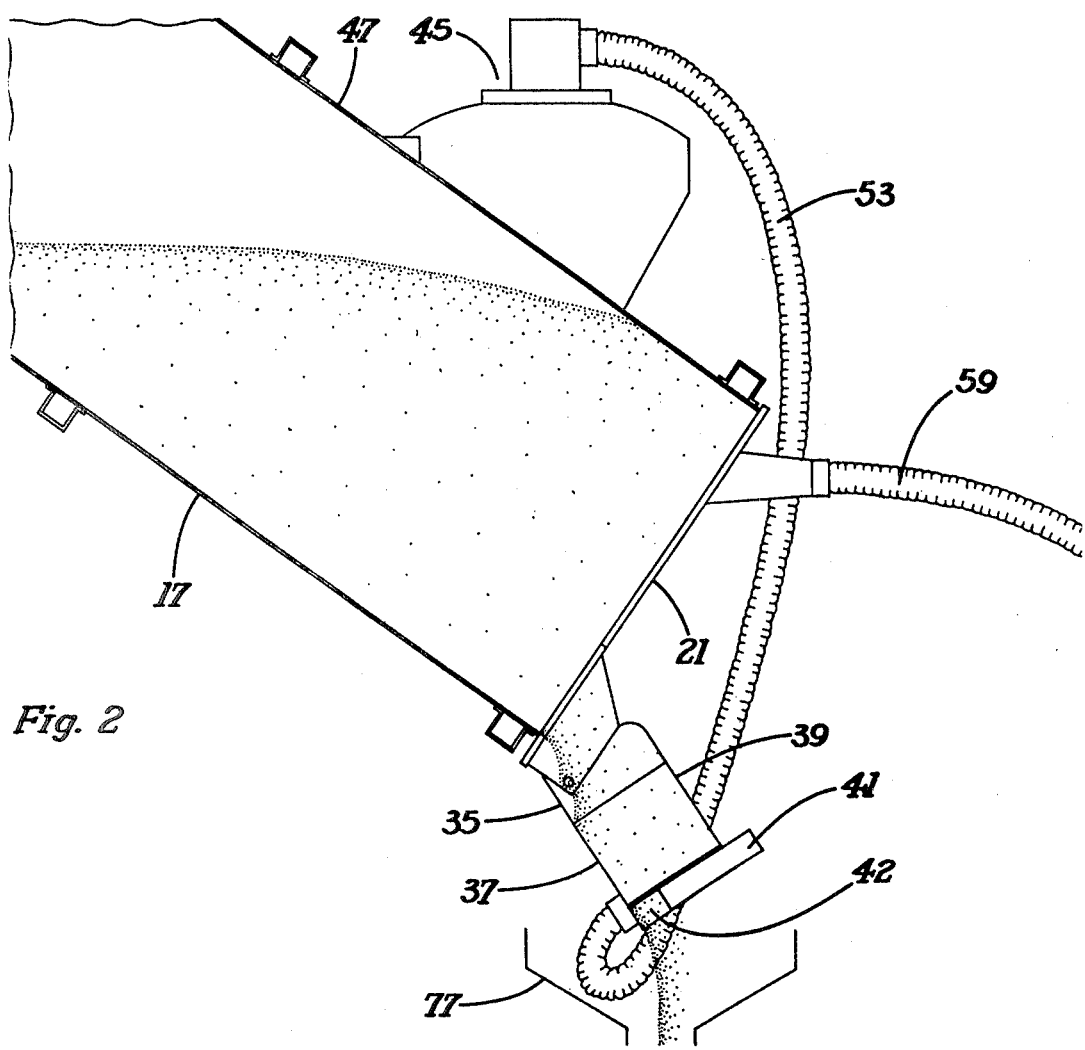
FIG. 2 is an enlarged, longitudinal vertical sectional view of part of the dump truck of FIG. 1, shown dumping by gravity into a hopper.

A receptacle or tray is secured to the rear walls 21. As shown also if FIG. 2, tray 35 has a bottom 37, an upright edge or wall 39 at the periphery and an open top. Wall 39 extends to the outer side of each gate 27 to funnel the bulk particles into the tray. A gate 41 is secured to the tray wall 39 at the center for closing an outlet 42. Gate 41 slides up and down wall 39 to allow the bulk particles to flow by gravity out of the tray as shown in FIG. 2.

Referring again to FIG. 1, a conventional hydraulic ram 43 is mounted between the frame 11 and the bottom of container 17. It serves as means to tilt the forward end of the container upward approximately 35° with respect to the frame, as shown in FIG. 1.

A pneumatic conveyor 45 is mounted to the container 17 in the cavity. Conveyor 45 includes a closed hopper or vessel 47. Vessel 47 is supported by a strap 49 with cylindrical arms 51 on each side pivotally secured to the cavity walls 25. The arms 51 and pivotal connections serve as mounting means for allowing the vessel 47 to remain in a vertical orientation when the container is tilted as shown in FIGS. 1 and 2.

Pneumatic conveyor 45 is of a known type. Preferably it is of a type shown in U.S. Pat. No. 3,372,958, Black, all of which material is hereby incorporated by reference. A conveyor of this type is marketed by Cyclonaire Corporation, Henderson, Nebraska and described in their published brochure entitled "Cyclonaire Pneumatic Bulk Conveying Systems".

Figure 3:
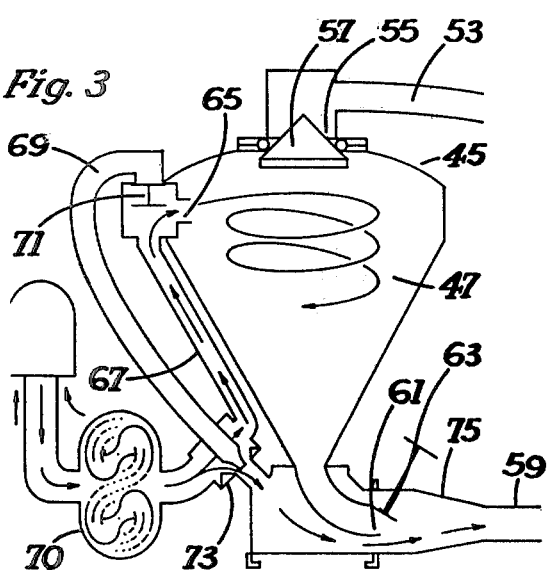
FIG. 3 is a schematic view of the pneumatic conveyor of the dump truck of FIG. 1, with the conveyor shown in the dicharging mode.
Figure 4:
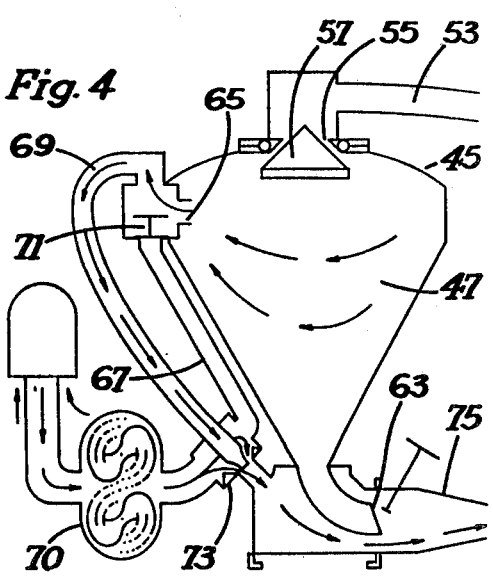
FIG. 4 is schematic view of the pneumatic conveyor shown in FIG. 3 with the conveyor shown in a loading mode.

Referring to FIGS. 3 and 4, the conveyor has an intake conduit 53 extending from the bottom 37 of tray 35 to an intake opening 55 at the top of the vessel 47. An intake valve 57 selectively seals and opens the intake opening 55. A discharge conduit 59 is in communication with a discharge opening 61 in the bottom of the vessel 47. A discharge valve 63 selectively opens and closes the discharge opening 61. A pressure port 65 is located in the upper portion of vessel 47. A pressure conduit 67 and a vacuum conduit 69 are in communication with port 65. A suction valve 71 places either the pressure conduit 67 or the vacuum conduit 69 in communication with the vessel 47. A blower or air pressure source 70 is connected to a venturi mainfold 73. The vacuum conduit has a free end of reduced cross-section extending into the venturi manifold 73. The pressure conduit 65 extends from the venturi manifold to the suction port 71. The venturi manifold 73 is also connected to a discharge manifold 75 that surrounds the discharge opening 63. Conduit 59 is directly connected to the discharge end of discharge manifold 75. Vessel 47 must be capable of withstanding pressure.

In operation, the container 17 is filled by removing hatches 19, and blowing or conveying the sand in. The container 17 can be either partially filled or completely filled. At the well site, the unit can be used to dump directly into the hopper 77 of the mixer as shown in FIG. 3. To perform this, hydraulic ram 43 is actuated to tilt the container 17. Rear gates 27 and tray gate 41 are opened to allow the sand to flow solely by gravity out the rear outlets 29 and tray outlet 42, and into the hopper 77.

To convey sand upward, such as to a storage silo 79, a shown in FIG. 1, discharge conduit 59 is connected to the silo intake. Container 17 is tilted by hydraulic cylinder 43. Blower 70 is energized, with inlet valve 57 open, discharge valve 63 closed, and suction valve 71 closing the air pressure conduit 67, as shown in FIG. 4. Rear gates 27 are open and tray gate 41 closed to fill the tray 35. As shown by the arrows in FIG. 4, air blowing through the venturi manifold creates a suction in the closed vessel 47. As the vessel 47 evacuates, it begins sucking sand from the tray 35 through the intake conduit 53 and into the vessel. When sufficiently filled, the intake valve 59 is closed, disscharge valve 63 opens, and suction valve 71 closes the vaccuum conduit 69. As shown in FIG. 3, air then blows through the pressure conduit 67, urging the sand out the discharge opening 61. At the same time, air blows through the discharge manifold 75, facilitating flow. Once the vessel has discharged its load, the cycle repeats. The valves, blower, pressure and vacuum conduits and manifolds serve as means for alternately evacuating and pressurizing the vessel to draw sand in and force it out. While the opening and closing of the valves to perform the cycle can be manually performed, preferably, the valves are connected to an automatic control circuit (not shown) to accomplish this.

As the sand is dumped out the rear opening 29, air is drawn in through the hatches, which are not constructed airtight, to fill the void left by the sand. The pressure in the container thus remains at atmosphere while dumping, whether the sand is being dumped into a hopper, or whether it is being conveyed upward to a silo 79.

Since the closed vessel 47 cannot fill and discharge itself at the same time, it may be necessary to close the rear gates 27 while in the discharge cycle. The inclined edge 31 of each gate 27 facilitates closing of the gate across a flow of sand. An edge that is perpendicular to the direction of gate travel would require much more force.

It should be apparent that an invention having significant advantages has been provided. The dump vehicle is capable of dumping conventionally or conveying upward to a storage facility. Also it is not necessary that the container be capable of withstanding pressure. This eliminates the need for two types of hauling units in well fracturing treatments. The unit of this invention is capable of hauling sand from the rail terminal to the field office, and conveying the sand by its pneumatic conveyor to the field office silo. The unit of this invention can also convey sand to the well site and either dump it directly into the mixer or convey it upward to a temporary well site silo. It can receive sand from the well site silo and dump it directly into the mixer. If a job is finished with sand remaining in the container, this can be blown back into the field office silo, thus avoiding wastage of sand. The dump vehicle can be used for hauling other products as well.

While the invention has been shown in only one of its forms, it should be apparent to those skilled in the art that it is not so limited, but is susceptible to various changes and modifications without departing from the spirit thereof.

We claim:

1. An apparatus for transporting dry bulk solids to a remote site, comprising in combination:

a frame mounted on wheels;

prime mover means for moving the frame to the remote site;

a container mounted to the frame for holding the solids;

the container having means for loading and rear outlet means for unloading;

means coupled to the frame and container for tilting the front end of the container upward with respect to the frame for discharging solids through the rear outlet means;

receptacle means coupled to the rear of the container for receiving solids discharged through the rear outlet means;

gate means for opening and closing the rear outlet means;

the receptacle means having outlet means for dumping solids behind the container by gravity when the container is tilted;

gate means for opening and closing the outlet means of the receptacle means; and pneumatic conveyor means carried by the apparatus and having intake means coupled to the receptacle means for receiving solids from the receptacle means and blowing the solids upward to a storage facility while the container is tilted;

the inside of the container being exposed to atmospheric pressure while dumping by gravity or while conveying by the pneumatic conveyor means.

2. The apparatus according to claim 1 wherein the pneumatic conveyor means comprises:

a closed vessel carried by the frame, the vessel having an inlet at the top, an outlet at the bottom, and a pressure port;

an inlet valve in the inlet;

an outlet valve in the outlet;

an intake conduit extending from the inlet to the receptacle means;

a discharge conduit connected to the outlet; and means in communication with the port for evacuating the vessel when the outlet valve is closed and the inlet valve open to suck solids from the receptacle means into the vessel, and then to pressurize the vessel when the inlet valve is closed and the outlet valve open to blow solids from the vessel into the discharge conduit.

3. The apparatus according to claim 2 further comprising mounting means for carrying the vessel by the frame so that the vessel remains in vertical position while the container is tilted.

4. The apparatus according to claim 1 wherein the receptacle means has an open top.

5. An apparatus for transporting dry bulk solids to a remote site, comprising in combination:

a frame mounted on wheels;

prime mover means for moving the frame to the remote site;

a container for holding the solids, pivotally mounted to the frame, the container having a top with an upper hatch for loading and two upright rear walls in a common plane and spaced laterally apart, defining in the space between them the rear opening of a cavity formed in the container and sealed from the interior of the container;

an outlet with a gate in each rear wall;

hydraulic ram means mounted to the frame and container for tilting the front end of the container upward with respect to the frame;

a tray secured to the rear walls for receiving solids discharged through the outlets while the container is tilted;

a gate in the tray for selectively dumping the solids from the tray into a hopper below it while the container is tilted;

a closed vessel pivotally mounted to the container in the cavity so that it remains upright while the container is tilted, the vessel having an inlet at the top, an outlet at the bottom and a pressure port;

an inlet valve in the inlet;

an outlet valve in the outlet;

an intake conduit extending from inlet to the bottom of the tray;

a discharge conduit extending from the outlet and adapted to discharge into a storage facility; and venturi means in communication with the port for evacuating the vessel while the outlet valve is closed and the inlet valve open to suck solids from the tray into the vessel, and then to pressurize the vessel when the inlet valve is closed and the outlet valve open to blow solids from the vessel into the discharge conduit and to the storage facility.

6. The apparatus according to claim 5 wherein each gate on the rear wall has a lower edge with a portion that is inclined with respect to direction of travel of the gate on the rear wall to facilitate closing while still discharging through the outlets in the rear walls.

* * * * *